Oct. 20, 1959  F. C. ARMISTEAD  2,909,661
RADIOACTIVITY BOREHOLE LOGGING
Filed Sept. 2, 1954  2 Sheets-Sheet 1
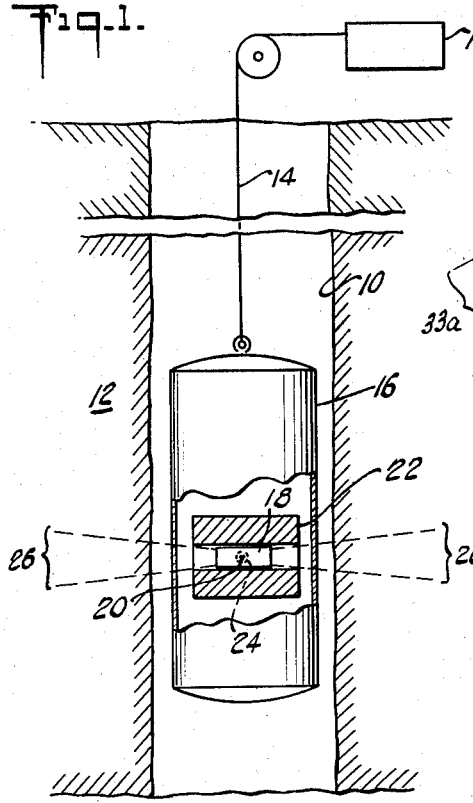
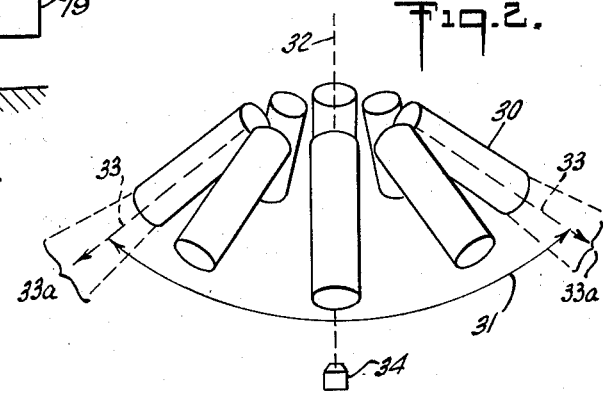
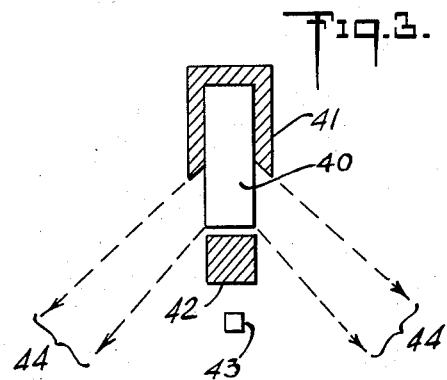
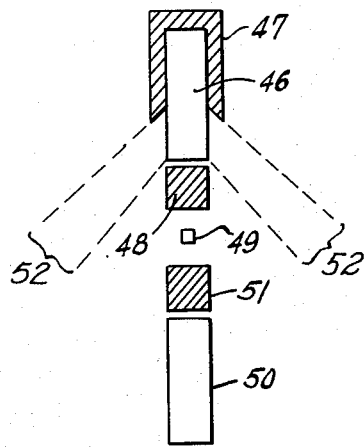
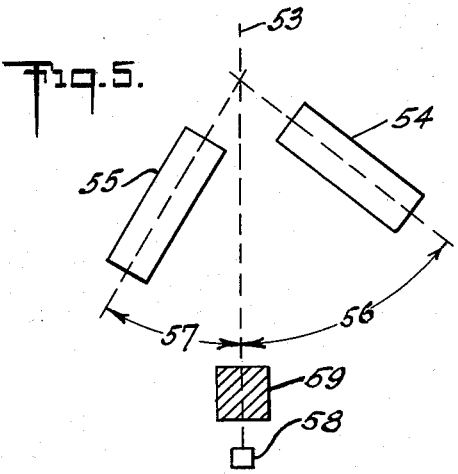

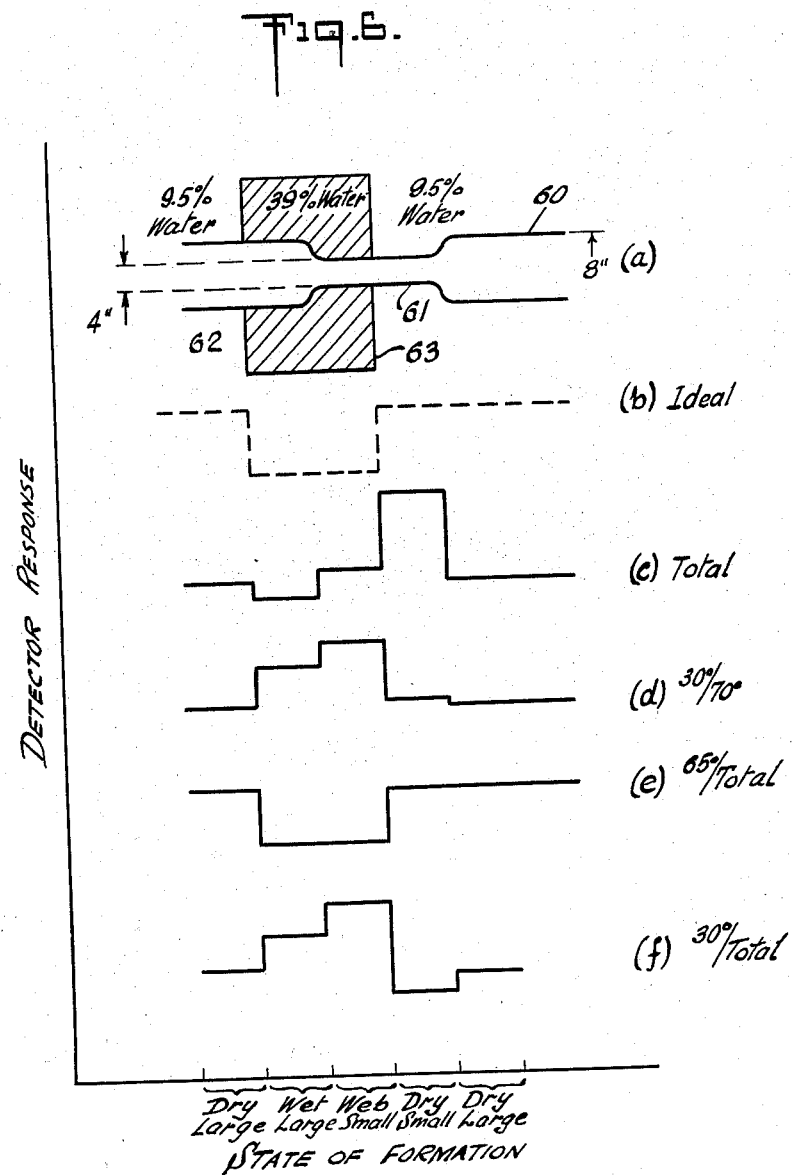

2,909,661

RADIOACTIVITY BOREHOLE LOGGING

Fontaine C. Armistead, Marblehead, Mass., assignor to Texaco Development Corporation, New York, N.Y., a corporation of Delaware Application September 2, 1954, Serial No. 453,912

14 Claims. (Cl. 250—83.3)

This invention relates to geophysical prospecting below the surface of the earth, and in particular to a method and an apparatus for determining the nature of the formations traversed by a borehole in the earth by means of a radioactivity log in such a manner that the effects of material in the borehole and borehole diameter variations on the log are substantially minimized.

My invention is especially directed to those methods of radioactive logging wherein primary radiation is directed from a source thereof in a borehole, into the formations surrounding the borehole. This primary radiation induces secondary radiation in the formations which is detected and measured by a suitable detector in the borehole, and which serves as an indication of the nature of the formations. Unfortunately, substances, such as drilling fluid, present in a borehole also react with the primary radiation and emit a secondary radiation which is detected and measured by the radiation detector. This later measurement tends to obscure the information obtained from the formation and to make the interpretation of the resulting log difficult.

I have discovered a method by means of which these disadvantages can be substantially overcome. I have found that, by orienting the radiation detector to receive radiation which traverses substantially only certain predetermined angles within the borehole, the radiation measurements made by the detector are substantially free of any effects introduced by material in the borehole.

A preferential arrangement of the apparatus which I contemplate using in the practice of my invention comprises a source of primary radiation and a detector of secondary radiation which are disposed in a known spaced relationship with respect to each other within a single housing adapted to be lowered into a borehole. The sensitive portion or portions of the detector, that is, the portion or portions capable of receiving and detecting the secondary radiation, may be defined by means of suitable shielding or by suitable construction of the detector. These sensitive portions are so chosen that substantially only that secondary radiation which arrives in the borehole at certain predetermined angles will be received by the detector. As will be explained in the following, the choice of predetermined angles is such that a measurement of the secondary radiation emitted by the formations can be made which is substantially free from errors introduced by the presence of the materials present within the borehole or by variations in the width of the borehole.

Since my invention is particularly applicable to neutron-gamma logging, wherein the primary radiation is fast neutrons and the secondary radiation is gamma rays, a consideration of the events which occur when a neutron-gamma borehole log is made will illustrate why it is necessary to discriminate between the measurement of the gamma radiation which arises in the formations and that which arises in the borehole. Fast neutrons emerge from a neutron source which is passed through the borehole, and, after many collisions with the atoms of the surrounding environment, which includes the contents of the borehole and the formations surrounding it, are slowed down to the velocity range where they exist as thermal neutrons. Since the ability of the hydrogen atoms in earth formations to slow down neutrons is so much greater than that of other atoms present therein, it can be assumed, during the logging period, that the rate of appearance of thermal neutrons within an earth formation (that is, the number of thermal neutrons created during any given period of time from the fast neutrons emitted by the source) is governed, for all practical purposes, by the hydrogen concentration thereof. Furthermore, in general, among the atoms present in an earth formation, the hydrogen atoms have a substantial ability to absorb thermal neutrons. Each time a thermal neutron is absorbed by an atom a gamma ray is produced and it is this induced gamma radiation which is detected and recorded in the neutron-gamma log.

These considerations also apply to the materials present within a borehole. That is, the hydrogen atoms present therein slow down fast neutrons from the source, absorb the consequent thermal neutrons, and emit gamma radiation.

The more hydrogen there is present near the source in the borehole, the more thermal neutrons are produced near the source, and consequently, the higher will be the rate of the production of gamma radiation near the source. However, in the formations beyond a certain distance from the source this effect appears to be reversed. That is, at such a distance from the source, the more hydrogen there is present in the formations, the less is the rate of production of gamma radiation. This phenomenon is explained by means of the principles stated above: the hydrogen which is in high concentration near the source slows down and absorbs so many neutrons that very few of them survive to react with the hydrogen present, even if at a high concentration, at a farther distance from the source.

Conventional neutron-gamma logs are made under these "far out" conditions, i.e., with source spaced 12 inches or more from the detector. In these conventional logs a difficulty arises which is caused by the fact that the radiation detector is not exclusively sensitive to the gamma radiation produced by the hydrogen and other atoms in the formations, but is sensitive to the gamma radiation produced by the hydrogen in the total environment surrounding the logging tool. In fact, since it is closest to the detector, the hydrogen in the materials present within the borehole has been found to have a greater effect on the conventional log than the hydrogen present in the formations themselves. This difficulty would not be serious if the hydrogen in the borehole produced a constant level of gamma ray intensity which could be subtracted from the total counting rate to obtain a log of the formation, but unfortunately, variations in the size or diameter of the borehole cause variations in the hydrogen content of the borehole and thus in the quantity of gamma radiation recorded by the logging tool. Therefore, a change in the intensity of the gamma radiation as recorded in making a conventional neutron-gamma log can mean a change in hydrogen content of the surrounding formations or can mean a change in the borehole size. If the change is caused by the former it is an important piece of information, the very thing that the neutron-gamma log is supposed to provide. However, if the latter is true then the importance of the log is substantially minimized and it may become exceedingly difficult to distinguish between significant and non-significant variations in the hydrogen content of the earth formations. The present invention provides a way of making this important distinction.

It is known that, in neutron-gamma well logging, the thermal neutron flux in the zone around the source and at its level in the borehole is relatively unaffected by variations in borehole size. In contrast, the thermal neutron flux in and around the borehole at levels above and below the source is relatively sensitive to changes in borehole size (see Tittle, Faul, and Goodman, Geophysics, vol. 16, No. 4, pp. 626–658, October 1951). I have discovered that by disposing the sensitive portion of the radiation detector so that it receives radiation only from the zone near the source, the effects of the borehole size on the recorded log are substantially minimized.

I have discovered further that there are preferred directions in this zone toward which the sensitive portion of the detector should be oriented. These directions are such that, by comparing the response of a detector oriented toward one of these directions with the response of a detector which is oriented to receive radiation from another of these directions or from all directions, it is possible to obtain from the comparative data a new type of neutron-gamma log. This log is relatively unaffected by variations in borehole size, but retains the desired sensitivity to the hydrogen content of the earth formations.

These and further advantages of my invention are explained in the following description and claims taken in conjunction with the attached drawings wherein:

Fig. 1 is a somewhat diagrammatic representation of one embodiment of my invention wherein a single detector is disposed in conjunctive relationship with a source of penetrative radiation, in a borehole logging instrument;

Figs. 2 and 3 illustrate forms of detectors which can be used in practicing my invention, Fig. 2 being a diagrammatic view in perspective of a directionally sensitive arrangement of detectors, and Fig. 3 being a cross-sectional view of a single detector made directionally sensitive by means of shielding;

Fig. 4 is a diagrammatic elevation of a modified form of the invention;

Fig. 5 is a diagrammatic elevation of another modification, and

Fig. 6 is a series of graphs illustrating results obtained by practicing my invention.

Referring to the drawing and particularly to Fig. 1 thereof, a small vertical section of a well borehole 10 is disclosed as traversing a subsurface formation 12. Suspended from a conductor cable 14 within the borehole is a well-logging instrument indicated generally by its sealed container 16. Shown as disposed transversely within the container or housing 16 is a detector 18 of penetrative radiation which detector may be in the form of a counter of the Geiger-Müller type, an ionization chamber or the like. The detector output may be led to a suitable preamplifier, not shown, within the housing 16 and then through the cable 14 to suitable amplifying and recording apparatus 19 at the surface. Within and substantially at the center of the detector 18 is a source of neutrons 20, and the detector and source are shown as disposed within a cylindrical shield 22. This shield is comprised of a material which is absorptive to the secondary radiation, for example, lead for the case of neutron-gamma logging, or boron, lithium or cadmium for neutron-neutron logging. If the source 20 is one which emits gamma radiation as well as neutrons, such as a mixture of radium and beryllium, the detector 18 may be shielded from the source 20 by means of a layer 24 of gamma ray absorptive material such as lead. It is to be understood that if a source such as polonium-beryllium is used, which source emits relatively few gamma rays compared to its neutrons, the shield 24 is not required to be as thick as if a radium-beryllium source is used.

The sensitive volume or volumes, i.e., the ends of the detector 18, are directed toward the zones 26 by means of the shielding 22. Thus the detector is arranged to receive substantially only the radiation which occurs in the zones 26 near the source 20 and in this manner the effects of the radiation originating in the borehole or the effects of variations in the size of the borehole on the response of the detector are substantially reduced.

Figs. 2 and 3 depict examples of detectors used in practicing my invention wherein the sensitive volume(s) of a detector or detectors are directed to the zone near the source when the radiation source 34 or 43 is disposed separately from the detector(s).

In Fig. 2 a plurality of separately disposed detectors, each disposed about the same vertical axis 32 in a fan- or cone-like array, is depicted. One of these detectors is indicated by the numeral 30. Its most sensitive direction is along the axis 33. The other detectors are substantially similar to this detector 30. By suitably arranging these detectors so that their axes lie on the surface of a cone with vertical axis 32, the array thereof, considered as a unit, will be primarily sensitive to radiations originating in the formation within the cone-shaped zone 33a scanned by all of the detectors.

Fig. 3 illustrates a single counter 40, the sensitive portion of which is defined by shields 41 and 42 corresponding, in effect, to the shield 22 of Fig. 1. A source of neutrons 43 is disposed in spaced-apart relationship with the detector 40. Here again, the detector 40 will receive and detect radiation only from the cone-shaped zone 44 defined by the shape of the shields 41 and 42.

In Fig. 4 a modified form of the invention is illustrated. In this figure detector 46, shield member 47, direct shield 48 and source 49 correspond to the elements 40, 41, 42 and 43 of Fig. 3. In Fig. 4 another detector 50 and another direct shield 51 are provided at the side of the source opposite the detector 46. The detector 50 is unshielded and is therefore responsive to secondary radiation arriving at it from substantially all directions, i.e., $4\pi$ steradians, while the detector 46 responds to secondary radiation arriving through the angle 52. As will be explained hereinafter it may be desired to measure simultaneously the secondary radiation arriving in a predetermined angle to the vertical axis of the borehole and secondary radiation arriving from substantially all directions. This can be accomplished by means of an apparatus such as is disclosed in Fig. 4.

Fig. 5 illustrates a modified form of the invention disclosed in Fig. 2. There may be times when it is desirable to measure simultaneously the secondary radiation arriving at a point or zone near the source from two different predetermined angles and to determine the ratio of the amounts or intensities of the radiation from the two different angles. In Fig. 5 the dotted line 53 indicates the vertical axis of the borehole and the logging instrument. The detectors 54 and 55 correspond to the detector 30 of Fig. 2, are directionally sensitive and disposed at two different angles, i.e., 56 and 57 with respect to the axis 53. A source of primary radiation 58 is separated from the detectors by means of direct shield 59. Thus with the apparatus shown in Fig. 5 a simultaneous measurement can be made of the secondary radiation traveling toward the axis 53 in two different angles, for example, 30° and 70°. As has been stated and will be explained hereinafter a comparison of the outputs of the two detectors 54 and 55 will provide an indication of the wetness of the formation being traversed by the logging instrument, while the effect of borehole diameter will be minimized.

It is understood that in the modifications illustrated in Figs. 4 and 5 the two detectors in each instance will preferably be connected through the cable to two recorders, not shown, at the surface so that a comparison can be made of the detector outputs and their ratio determined.

In Fig. 6 graphs are shown of several neutron-gamma log traces obtained in traversing a test sequence of formations having different degrees of wetness and borehole size. The abscissae of these traces refer to the depth of the detector in the borehole, or, in other words, the borehole is represented here as lying in a horizontal plane. The ordinates refer to the detector response expressed as percentages of the response in an 8-inch borehole through a dry formation. The changes in borehole size and formation contents are shown diagrammatically in (a) of the figure. In Fig. 6(a), the numerals 60 and 61 refer to the borehole, the numeral 60 referring to that part of the borehole having a width of 8 inches, and the numeral 61 referring to that part having a width of 4 inches. The numerals 62 and 63 refer to the formations surrounding the borehole, that indicated by 62 having a wetness of 9.5% water, and that indicated by 63 having a wetness of 39% water.

Curve (b) represents an ideal log trace which shows a definite change in detector response for changes in formation wetness and no change in detector response with respect to borehole size. That is, the log trace shows a substantial change as the detector moves from dry formation 62 to wet formation 63 or vice versa, whereas the log is constant, despite a change in bore hole size. This log trace is called "ideal" because it shows formation wetness only and is completely insensitive to a clear change occurring in borehole size. The direction of the change, that is, whether a positive or a negative step with the log trace, is of no practical importance, and if the ideal trace were inverted to give positive instead of a negative step it would still be ideal.

Curve (c) represents a neutron-gamma log of the conventional type. It can be seen from this curve that changes in borehole size completely mask the changes in borehole wetness. The difference between the large and small borehole responses in a dry formation is a particularly good illustration of the likelihood that a conventional neutron-gamma log may be misleading.

The remaining curves (d), (e), and (f) represent logs obtained by my invention, wherein detectors are aimed at certain predetermined angles. As stated hereinabove angles are measured from the axis of the borehole, i.e., 0° is straight down. "Radiation arriving at a certain angle" means radiation arriving from that angle contained between two conical surfaces at angles equal to the certain angle plus or minus 10°. To accomplish this, and as illustrated in Fig. 5, one or more detectors may be aimed at one angle to the borehole axis while another detector or detectors may be aimed at a different angle. Again, as illustrated in Fig. 4 one or more detectors may be aimed with their sensitive volumes directed in a certain angle to the axis, while another detector or detectors may be of a type or disposed so as to respond to radiation coming from substantially all directions. The detector or groups of detectors will of course be connected through conductors of the cable 14 to corresponding recording devices, not shown, at the surface.

Curve (d) represents the log obtained from the ratio of the neutron-gamma counts recorded by one detector which detects those gamma rays arriving at a 30° angle and a second detector which records gamma rays arriving at a 70° angle. The curve (e) represents the ratio of two detectors one of which records neutron-gammas arriving at a 65° angle while the other records neutron-gammas received by the detector from all directions. Finally, the curve (f) represents the ratio of the outputs of two detectors, one of which records those neutron-gammas arriving at the detector from an angle of 30° while the other records gamma rays arriving from all directions.

An examination of these curves, (d), (e), and (f), shows that the effect of the borehole size on the log trace is substantially suppressed, whereas a clear indication is given of the hydrogen content of the formations. In other words, curves (d), (e), and (f) are all good approximations to the ideal curve (b).

The foregoing examples are not to be construed in any way as limiting my invention since many modifications of my invention, other than those illustrated herein, are possible, the only essential factor being that a detector must be constructed to have its sensitive portion directed to the zone of minimum dependence on borehole size. In a similar manner, many modifications of the arrangements shown in Figs. 1 through 5 will come to mind. For instance, detectors of the scintillation type may be used.

In those cases where detectors are used whose sensitive volumes are directed at different predetermined angles with respect to the borehole axis and the ratio of the outputs of these detectors are determined and compared, it is further contemplated that more than two detectors may be used. The outputs of these detectors are determined and combined in a manner similar to that used for two detectors.

Obviously, many other modifications and variations of my invention as hereinbefore set forth, may be made without departing from the spirit and scope thereof, and therefore, only such limitations should be imposed as are indicated in the appended claims.

I claim:

1. A method of radioactivity borehole logging comprising the steps of continuously passing, substantially along the axis of the borehole, a source of penetrative radiation from which primary radiation passes outwardly into the hole and into the formations surrounding the hole to induce secondary radiation therein, continuously detecting and measuring the intensity of said secondary radiation passing toward the borehole axis at two predetermined angles with respect to said axis, and determining the ratio of the quantities of secondary radiation at each of said angles.

2. The method of radioactivity borehole logging according to claim 1 wherein one of said angles is substantially 30° with respect to the vertical axis of the borehole, and the other of said angles is substantially 70° with respect to the vertical axis of the borehole.

3. A method of radioactivity borehole logging comprising the steps of continuously passing, substantially along the axis of the borehole, a source of penetrative radiation from which primary radiation passes outwardly into the hole and into the formations surrounding the hole to induce secondary radiation therein, continuously detecting and measuring the intensity of said secondary radiation passing toward the borehole axis at a predetermined angle with respect to said axis and also from all angles, i.e. $4\pi$ steradians of solid angle, and determining the ratio of the quantities of secondary radiation at the predetermined angle and from all angles.

4. The method of radioactivity borehole logging according to claim 3 wherein one of said angles is substantially 65° with respect to the vertical axis of the borehole, and the other of said angles is substantially $4\pi$ steradians.

5. The method of radioactivity borehole logging according to claim 3 wherein one of said angles is substantially 30° with respect to the vertical axis of the borehole and the other of said angles is substantially $4\pi$ steradians.

6. The method of claim 1 wherein said secondary radiation passing toward the bore hole axis at the two predetermined angles is directed toward substantially the same location along the axis of the bore hole.

7. The method of claim 3 wherein said secondary radiation passing toward the bore hole axis at said predetermined angle and from all angles is directed toward substantially the same location along the bore hole axis.

8. The method of claim 6 wherein said primary radiation is in the form of neutrons and wherein said secondary radiation is in the form of gamma rays.

9. The method of claim 7 wherein said primary radiation is in the form of neutrons and wherein said secondary radiation is in the form of gamma rays.

10. In an apparatus for radioactivity borehole logging which includes a source of primary penetrative radiation adapted to be passed substantially along the vertical axis of the borehole for inducing secondary radiation in the material and formations in and surrounding the borehole, the improvement which comprises in combination, a detector of said secondary radiation directionally sensitive at a predetermined angle with respect to the vertical axis of the borehole, a second detector of said secondary radiation directionally sensitive at a predetermined different angle with respect to the vertical axis of the borehole and means for measuring the outputs of said detectors.

11. In an apparatus for radioactivity borehole logging which contains a source of primary radiation for inducing secondary radiation in the formations surrounding the borehole, the improvement comprising in combination, a detector of said secondary radiation directionally sensitive at a substantially 30° angle with respect to the vertical axis of the borehole, a second detector of said secondary radiation directionally sensitive at a substantially 70° angle with respect to the vertical axis of the borehole, said detectors being disposed in spaced-apart relationship with each other and with said source, and means for comparing the output of said detectors.

12. In an apparatus for borehole logging which contains a source of primary radiation for inducing secondary radiation in the formations surrounding the borehole, the improvement comprising a detector of said secondary radiation directionally sensitive at a substantially 65° angle with respect to the vertical axis of the borehole, a second detector of said secondary radiation directionally sensitive over a solid angle of substantially $4\pi$ steradians, said detectors being disposed in spaced-apart relationship with each other and with said source, and means for comparing the outputs of said detectors.

13. In an apparatus for radioactivity borehole logging which contains a source of primary radiation for inducing secondary radiation in the formations surrounding the borehole, the improvement comprising a detector of said secondary radiation directionally sensitive at a substan-substantially 30° angle with respect to the vertical axis of the borehole, a second detector of said secondary radiation directionally sensitive over a solid angle substantially $4\pi$ steradians, said detectors being disposed in spaced-apart relationship with each other and with said source, and means for comparing the outputs of said detectors.

14. In an apparatus for borehole logging which contains a source of primary radiation for inducing secondary radiation in the formations surrounding the borehole, the improvement comprising a detector of said secondary radiation directionally sensitive at a predetermined angle with respect to the vertical axis of the borehole, a second detector of said secondary radiation sensitive in all directions, i.e. over a solid angle of $4\pi$ steradians, said detectors being disposed in spaced-apart relationship with each other and with said source, and means for comparing the outputs of said detectors.

References Cited in the file of this patent

UNITED STATES PATENTS

| | | |
|---|---|---|
| 2,469,461 | Russell | May 10, 1949 |
| 2,522,522 | Krasnow | Sept. 19, 1950 |
| 2,673,299 | Krasnow | Mar. 23, 1954 |
| 2,769,918 | Tittle | Nov. 6, 1956 |